United States Patent
Gordon et al.

(10) Patent No.: US 7,818,664 B2
(45) Date of Patent: Oct. 19, 2010

(54) MULTIMODAL XML DELIVERY SYSTEM AND METHOD

(75) Inventors: Glen Gordon, St. Petersburg, FL (US); Christian Hofstader, St. Petersburg, FL (US); Joseph Stephen, St. Petersburg, FL (US); Eric Damery, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 10/907,015

(22) Filed: Mar. 16, 2005

(65) Prior Publication Data

US 2005/0210030 A1 Sep. 22, 2005

Related U.S. Application Data (60) Provisional application No. 60/521,228, filed on Mar. 16, 2004.

(51) Int. Cl.
 *G06F 17/00* (2006.01)
(52) U.S. Cl. .................. 715/234; 715/236; 715/239; 715/242; 715/249; 715/729
(58) Field of Classification Search .............. 715/517, 715/523, 513, 234, 236, 239, 242, 249, 702, 715/729
See application file for complete search history.

(56) References Cited

U.S. PATENT DOCUMENTS

| | | | |
|---|---|---|---|
| 6,012,098 A * | 1/2000 | Bayeh et al. ............... 709/246 |
| 6,282,511 B1 * | 8/2001 | Mayer ........................ 704/270 |
| 6,510,434 B1 * | 1/2003 | Anderson et al. ........... 707/100 |
| 6,829,746 B1 * | 12/2004 | Schwerdtfeger et al. .... 715/239 |
| 7,111,231 B1 * | 9/2006 | Huck et al. ................. 715/513 |
| 7,134,072 B1 * | 11/2006 | Lovett et al. ............... 715/513 |
| 7,162,626 B2 * | 1/2007 | Zimmer et al. ................ 713/2 |
| 7,434,167 B2 * | 10/2008 | Sinclair et al. ............. 715/744 |
| 7,490,313 B2 * | 2/2009 | Sinclair et al. ............. 717/100 |
| 7,681,129 B2 * | 3/2010 | Cragun ...................... 715/728 |
| 2002/0111974 A1 | 8/2002 | Dutta et al. |
| 2002/0143817 A1 | 10/2002 | Dutta et al. |
| 2004/0176958 A1* | 9/2004 | Salmenkaita et al. ........ 704/275 |
| 2007/0027692 A1* | 2/2007 | Sharma et al. ........... 704/270.1 |

OTHER PUBLICATIONS

Benjamin Campin, 'SVG Maps For People With Visual Impairment', Conference papers published Jul. 2003, pp. 1-14.*

(Continued)

*Primary Examiner*—Stephen S Hong
*Assistant Examiner*—Matthew J Ludwig
(74) *Attorney, Agent, or Firm*—Anton J. Hopen; Smith & Hopen, P.A.

(57) ABSTRACT

The present invention is a computer software product and method including an XML parsing module, a translation module communicatively coupled to the XML parsing module and an output module communicatively coupled to the translation module, the output module configurable by the end user to execute a predefined event responsive to the processing of an associated XML tag. The predefined event may be selected from a group consisting of audio output modification, visual output modification, and tactile output modification. These output modifications may include, but are not limited to, voice inflection, voice gender, voice volume, voice pitch, voice speed, visual display modification, visual display cues, tactile device output modification and the like.

8 Claims, 6 Drawing Sheets

OTHER PUBLICATIONS

Lori Stefano Petrucci, et al., WebSound: a generic Web sonification tool, and its application to an auditory Web browser for blind and visually impaired users, Proceedings of the Sixth International Conference on Auditory Display, XP-002556476, Apr. 2000, pp. 1-4.

Mercedes Macias, et al., On Adaptability of Web Sites for Visually Handicapped People, Proceedings of the Second International Conference on Adaptive Hypermedia and Adaptive Web-Based Systems, XP-002556475, May 2002, pp. 264-273.

Ian Jacobs, et al., User Agent Accessibility Guidelines 1.0, W3C Recommendation, XP-002556477, Dec. 2002, pp. 1-86.

* cited by examiner

MULTIMODAL XML DELIVERY SYSTEM AND METHOD

CROSS REFERENCE TO RELATED DISCLOSURE

This application claims priority to U.S. provisional patent application Ser. No. 60/521,228 filed by the same inventors on Mar. 16, 2004 entitled: "Multimodal XML Delivery"

BACKGROUND OF INVENTION

As the population of computer users grows, so does the variety of special needs of the users. For a user to maximize their efficiency in completing tasks on a computer, the user interface must meet their specific requirements.

For the purposes of this document, the term "typical computer user" will refer to individuals without any impairment, mild or severe. A typical computer user can effectively use a computer without employing any adaptive hardware or software, and without using any accessibility features that may be built into the computer's operating system.

Blind computers users are unable to see the screen on a computer so must access the information using some form of access technology. They may listen to the information through a text to speech engine, read the information on a refreshable Braille display or feel the information utilizing a Haptic display. With these adaptive features, software delivers the information to the various output devices by taking the information from the screen buffer, acquiring it from an application program interface (API) or by generating the information internally from its own data.

Low vision users differ from blind users as they can see some things but are still unable to read a computer screen without augmentation to the image being displayed. Low vision computer users may employ screen magnification software, screen reader software using text to speech output or work with the features of the operating system to change colors, mouse pointers and other attributes of the display to make customize the image to address their specific requirements.

Deaf and hearing impaired computer users can see the contents of a computer screen but are unable to hear the information delivered in an auditory manner. Many deaf people also have difficulty with written text in their native language as the various sign languages used around the world often differ from the spoken or written word. To maximize their efficiency on a computer, a deaf or hearing impaired user may employ visual cues to deliver information that otherwise may have been presented as a sound. A deaf user may also use a screen reader that turns written text into sign language delivered by an animated avatar.

Computer users who are both deaf and blind use computers with screen reading software that sends information to a refreshable Braille display. To interface with the computer, they provide input to the computer utilizing controls on the Braille display or with a keyboard.

Individuals with learning disabilities have a wide variety of different needs that must be met in order for them to effectively use a computer. These requirements vary from changing colors of text, changing the spacing between words, changing the shape of characters to be tall and thin or short and wide, using software that delivers information through a text to speech engine or employing a wide array of different augmentations to the information presented on a computer screen.

Many mobility impaired users have no difficulty accessing the information provided by a computer but, rather, require physical accommodation, such as a special desk designed to accommodate a wheelchair. Individuals whose motor impairments affect their ability to type on a keyboard or otherwise use their hands do require special adaptive hardware and software to be able to provide input and command and control to a computer.

For the purposes of this document, the term, "temporarily disabled" refers to individuals who, due to a temporary circumstance, lose the ability to use their eyes, ears, hands or some other human attribute. Examples of temporarily disabled individuals include motorists, who cannot take their eyes off of the road or their hands off of the steering wheel; people working in very loud places where they cannot hear the audio from a computer and people performing other tasks that cause them to be unable to interact with a computer in a typical fashion.

The list above describes some of the more common special needs that a computer user may experience, either permanently or temporarily.

Visual difficulties and impairments include low vision, color blindness, and blindness. There are many options for individuals with vision difficulties to modify the computer displays and appearance so it is more legible, or receive information through sound or touch. These options are commonly referred to in the industry as, "assistive" or "adaptive" technologies. Individuals who have visual difficulties and impairments may utilize any one, or a combination of, assistive technologies including screen enlargers, screen readers, speech recognition systems, voice recognition programs, speech synthesizers, text-to-speech systems, refreshable Braille displays, Braille embossers, talking word processors and large-print word processors.

To succeed in a professional environment, most employees need to create, read, collaborate on and share documents of many different types generated from many different software programs. Visually impaired individuals have often struggled to perform some of the most basic document related tasks as it is very difficult and in some cases, impossible for them to understand the subtleties conveyed through visual attributes and alignment of text.

Systems currently known in the art utilize unstructured data formats to provide data to assistive technology devices. The use of unstructured data formats requires that the software make continuous calls to component object modules (COM) to establish the relationship between the assistive technology device and the unstructured data format. With these call to COM objects, the data formats are unable to convey the subtleties inherent in most basic documents. The need to make repeated calls to a COM object required substantial processing and generates latencies in the system that are effect the experience of the end user.

It is known in the art that computer programs utilize extensible markup language (XML) as the native document format for their data storage. XML is simply a string format in which the string contains text descriptions (descriptors) for the data in the string. These descriptors allow a parser to find information in the string without the string having a predefined format.

Accordingly, what is needed in the art is a system and method that transforms XML information from an application into a user definable audio, visual or tactile enriched document.

SUMMARY OF INVENTION

This present invention provides a system and method to incorporate XML information expressed in a wide variety of special purpose XML formats into a single computer program that is capable of providing information to a universal audience of computer users.

The present invention is a computer software product including an XML parsing module, a translation module communicatively coupled to the XML parsing module and an output module communicatively coupled to the translation module, the output module configurable by the end user to execute a predefined event responsive to the processing of an associated XML tag. The predefined event may be is selected from a group consisting of audio output modification, visual output modification, and tactile output modification. These output modifications may include, but are not limited to, voice inflection, voice gender, voice volume, voice pitch, voice speed, visual display modification, visual display cues, tactile device output modification and the like.

In an embodiment of the invention, a universal document type definition database (DTD) is provided which is communicatively coupled to the translation module. Common fields from different XML definitions are mapped to a root identity. This root identity generally is associated with a primary key in a database table. A registration module communicatively coupled to the definition database permits third parties to map new XML definitions to root identities. Thus, normally incongruent definitions across scientific, artistic, political and engineering XML schemas are mapped into a common standard for consistent output by the software application. As the potential output mediums are virtually limitless, an output API module may be provided so that third party developers may generate custom output events responsive to calls to the translation module.

In accordance with an embodiment of the present invention, a method of causing an assistive technology output module to respond to an XML document is provided including the steps of parsing an XML document, identifying at least one XML tag from the parsed XML document, translating the at least one XML tag, providing the at least one translated XML tag to an assistive technology output module and causing the assistive technology output module to execute a predefined event in response to the at least one translated XML tag. The XML tags identify features of the document, such as text attributes and text layout.

In an additional embodiment, the method in accordance with the present invention further includes providing a universal document type definition database having at least one common root identity, mapping each of the at least one translated XML tags to each of the at least one common root identifies, and causing the assistive technology output module to execute a predefined event in response to the at least one common root identity.

To succeed in a professional environment, most employees need to create, read, collaborate on and share documents of many different types generated from many different software programs. Visually impaired individuals have often struggled to perform some of the most basic document related tasks as it is very difficult and in some cases, impossible for them to understand the subtleties conveyed through visual attributes and alignment of text. The present invention overcomes these difficulties and provides visually impaired users with a solution that will allow them to compete in the market for professional positions by removing this barrier.

The present invention provides an architecture that enables additional user interface elements to be added in the future that will accommodate individuals with requirements not anticipated in the original design.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
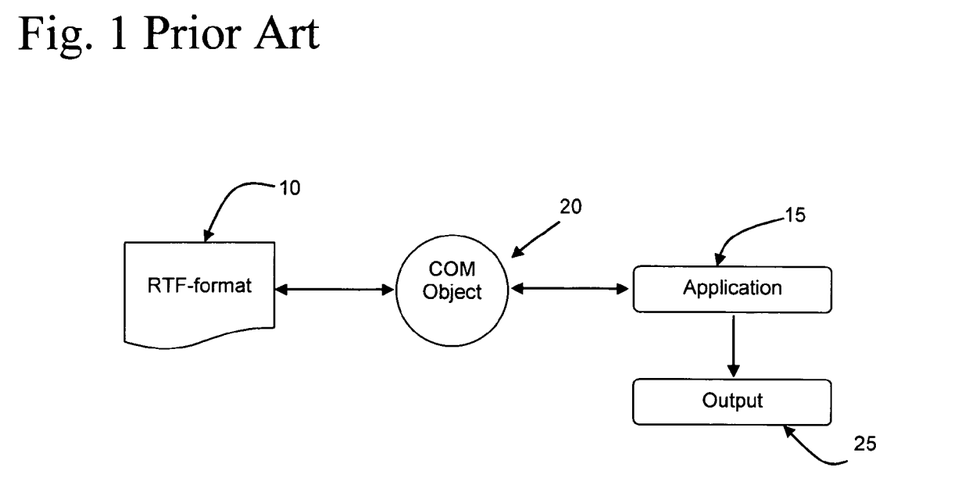
FIG. 1 is a diagrammatic view of the prior art.
Figure 2:
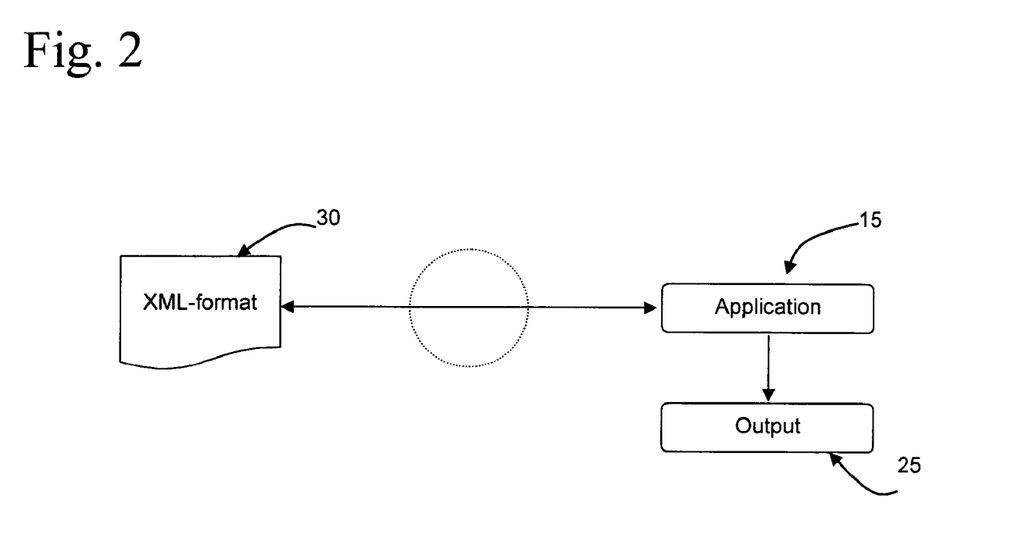
FIG. 2 is a diagrammatic view of a fundamental process according to the invention.

Referring to FIG. 1, prior art translation systems read unstructured formats such as rich text file (RTF) 10. To effectively extract formatting information from such files, the software application 15 used to generate alternative output 25 (i.e., speech or Braille) had to make calls to a COM object 20. This method required a substantial processing and generated latency issues for the end user. However, with the migration of many documents to an XML format 30, translations under the present invention require no intermediate call to the COM (computer object model) object and processing latency is reduced by several magnitudes, as illustrated with reference to FIG. 2.

The concept is analogous to XSL (Extensible Stylesheet Language). XSL, formerly called Extensible Style Language, is a language for creating a style sheet that describes how data sent over the Web using XML is to be presented to the user. For example, in an XML page that describes the characteristics of one or more Braille readers, a set of open and close tags might contain the name of a Braille cell manufacturer. Using XSL, one could tell the Web browser that the Braille cell part number should be displayed, where to display it on a page and that it should be displayed in a bold font. XSL is based on and extends the Document Style Semantics and Specification Language (DSSSL) and the Cascading Style Sheet, level 1 (CSS1) standards.

The present invention extends XSL to assistive technology output devices such as those used by the disabled. For example, while an XSL sheet might apply certain logic to present all bold text in a different font, the present invention applies predefined logic to cause a speech synthesizer to add inflection to the spoken voice when a word with bold formatting is read aloud. In addition, while XSL formatting is generally done server-side, the present invention anticipates that the output be end-user configurable to accommodate the special needs of the individual using the application.

Figure 3:
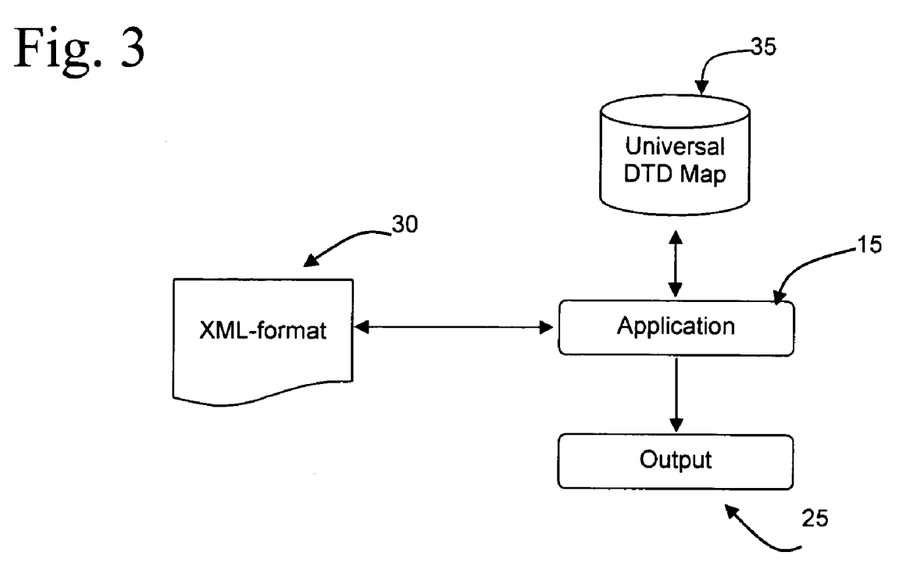
FIG. 3 is a diagrammatic view of an embodiment of the invention utilizing a universal DTD map.
Figure 4:
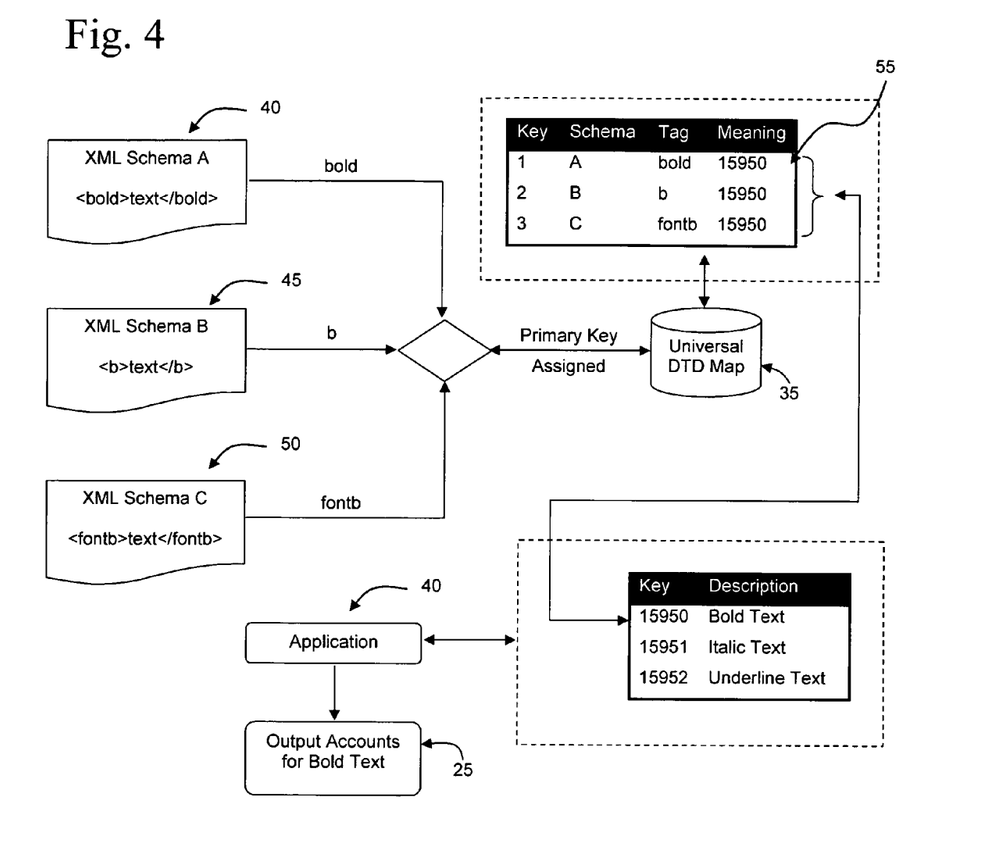
FIG. 4 is a diagrammatic view of an embodiment of the invention illustrating multiple XML mapping to a root identity.

There are numerous XML specifications which use different tags to designate the same action. In FIGS. 3-4, a universal DTD map database 35 is provided to translate different tags into a common root identity whereby consistent output 25 is enjoyed by the end user regardless of the XML specification they are exposed to through the software. For example, in FIG. 4, XML Schemas A-C each have a different tag for applying bold formatting to a text string. XML Schema A 40 uses a "bold" tag. XML Schema B 45 uses a "b" tag. XML Schema C 50 uses a "fontb" tag. However, for the end user to experience a common output among these inconsistent tags, each tag is mapped to the universal DTD map database 35. A common root identity 55 (integer 15950 in this example) is associated with each tag and the common root identity is used to call the output event.

Figure 5:
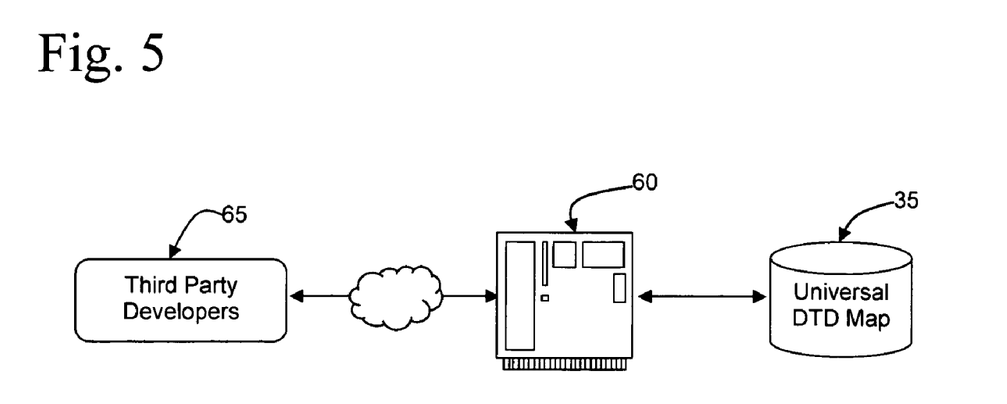
FIG. 5 is a diagrammatic view of a registration module according to an embodiment of the invention.

As new XML specifications are constantly being generated, a registration module 60 is provided in FIG. 5 to permit third party developers 65 to map their self-defined XML tags to the universal DTD map database 35. As well-formed XML documents identify their origin, the origin string can be compared to the universal DTD map database. If the tags for that XML specification are already mapped, then the software application may download the mapping to a local computer to increase performance or may remotely translate the tags on an ad hoc basis.

Figure 6:
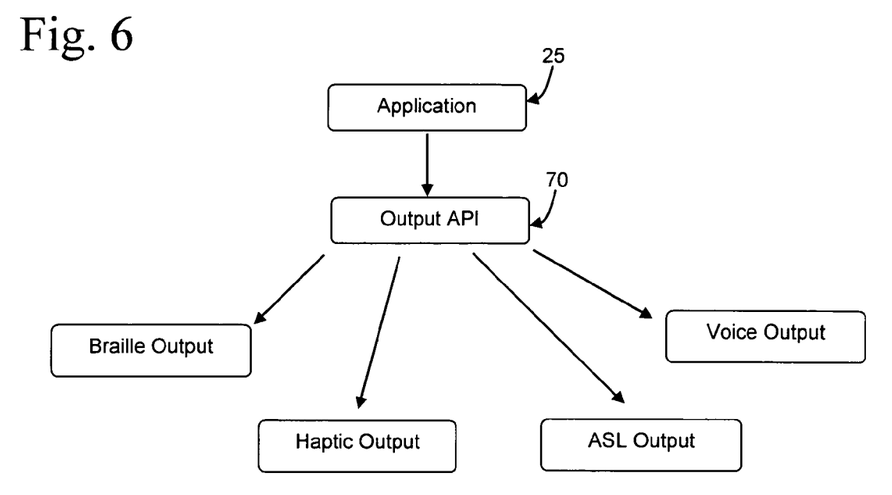
FIG. 6 is a diagrammatic view of an output API module according to an embodiment of the invention.

In FIG. 6, an output API (application program interface) 70 is provided to permit third party developers 65 to access the common root identities 55 of the XML tags. Thus, new output mediums may be adopted and utilized through the present invention as the need or demand arises.

The main module in this invention will provide a basic set of user interface modes which can be extended through its plug-in model described below to a plurality of modalities. The modalities envisioned by the present invention include, but are not limited to:

Graphical User Interfaces: One set of user interface modalities will be graphical in nature. These will serve the typical, deaf, learning and reading disabled and other classes of users who can interpret information displayed on a screen.

Textual, Symbolic and Graphical Information Displayed on a Computer Monitor: The graphical user interface will display textual, symbolic and images on the computer monitor. It may, when appropriate, display animated images as well.

Auditory User Interfaces: To serve the needs of users who cannot derive information visually from the computer screen, auditory user interface primitives will be available in the multi-modal main module.

Text to Speech Interface: The main module will provide a text to speech interface that can be used by the plug in, format specific controls.

Auditory Representation of Symbolic and Graphical Information: The main module will provide the ability for the plug-in modules to play sounds to convey information to the users of the invention.

Tactile User Interfaces: In addition to auditory user interfaces, some users who can not effectively access information on the screen can use a variety of tactile methods to gain access to the information.

Braille Output: The main module of this system will provide the ability for the plug-in modules to deliver information to refreshable Braille displays.

Loadable Braille Tables: The main module will understand marked up textual information in a manner that it can load different tables for different Braille systems.

Tactile Graphics Output: Some information cannot practically be delivered through either an auditory or a Braille system. To accommodate the requirements for such information to be delivered to users who require it, this system will include access to tactile graphics.

Output to a Haptic Display: Haptic displays provide three dimensional tactile information to users who cannot access information displayed on a computer screen. The main module of this invention will permit the plug-in interpreters to manipulate these displays.

Additional Output Methods: This invention will permit third parties to write software that can offer output methods not anticipated by the original inventors.

In order to meet the requirements of all different classes of users, this invention is extensible by its original implementers as well as third parties who may elect to provide a user interface for a class of users that were not included in the original plans for the software. It is, in fact, this extensibility that makes the invention unique in the area of providing access to a universal audience.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described, What is claimed is:

1. A computer software product including software executable instructions stored in a computer readable medium for performing a method by running a software program on a computer, the method including issuing instructions from the computer software program comprising:

parsing an extensible structured document;

identifying at least one tag from the parsed document;

identifying at least one data element associated with the at least one tag;

translating the at least one tag;

providing a document type definition map database having a plurality of common root identities mapped to a plurality of translated tags;

mapping each translated tag to its common root identity; and causing the assistive technology output module to modify the presentation of at least one data element associated with the at least one tag in response to the at least one translated tag, wherein the modification is audio output modification of at least one member of the group comprising voice inflection, voice gender, voice volume, voice pitch and voice speed in response to the at least one common root identity.

2. The computer software product of claim 1 further comprising instructions for a registration module communicatively coupled to the definition map database, the registration module to map new document definitions to common root identities.

3. The computer software product of claim 1 further comprising instructions to provide an output API module adapted to receive custom output events responsive to calls to the translation module.

4. A method of modifying the output of an assistive technology output module in response to an extensible structured document, the method comprising the steps of:

parsing an extensible structured document;

identifying at least one tag from the parsed document;

identifying at least one data element associated with the at least one tag;

translating the at least one tag;

providing a document type definition map database having a plurality of common root identities mapped to a plurality of translated tags;

mapping each translated tag to its common root identity; and causing the assistive technology output module to modify the presentation of at least one data element associated with the at least one tag in response to the at least one translated tag, wherein the modification is audio output modification of at least one member of the group comprising voice inflection, voice gender, voice volume, voice pitch and voice speed in response to the at least one common root identity.

5. The method of claim 4, wherein the at least one tag identifies a text attribute.

6. The method of claim 4, wherein the at least one tag identifies a text layout.

7. The method of claim 4, wherein the modification is defined by an end user.

8. A computer software product including software executable instructions stored in a computer readable medium for performing a method by running a software program on a computer, the method including issuing instructions from the computer software program comprising:

parsing an extensible structured document;

identifying at least one tag from the parsed document;

identifying at least one data element associated with the at least one tag;

translating the at least one tag;

providing a document type definition map database having a plurality of common root identities mapped to a plurality of translated tags;

mapping each translated tag to its common root identity; and causing the assistive technology output module to modify the presentation of at least one data element associated with the at least one tag in response to the at least one translated tag, wherein the modification is tactile output.

* * * * *